US012725385B1

(12) United States Patent
Wood et al.

(10) Patent No.: US 12,725,385 B1
(45) Date of Patent: Sep. 1, 2026

(54) GENERALIZED LIKELIHOOD RATIO TEST FOR DUAL BAND IMAGERY

(71) Applicant: BAE SYSTEMS INFORMATION AND ELECTRONIC SYSTEMS INTEGRATION INC., Nashua, NH (US)

(72) Inventors: Benjamin P. Wood, Bedford, MA (US); Jeffrey A. Wallace, Nashua, NH (US); Marc J. Fredette, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 538 days.

(21) Appl. No.: 17/752,413

(22) Filed: May 24, 2022

(51) Int. Cl.

| | |
|---|---|
| ***G06V 10/36*** | (2022.01) |
| ***G06V 10/143*** | (2022.01) |
| ***G06V 10/147*** | (2022.01) |
| ***G06V 10/20*** | (2022.01) |
| ***G06V 10/94*** | (2022.01) |
| ***H04N 25/131*** | (2023.01) |
| ***H04N 25/703*** | (2023.01) |
| ***H04N 25/708*** | (2023.01) |
| *G06V 20/17* | (2022.01) |

(52) U.S. Cl.
CPC .......... *G06V 10/143* (2022.01); *G06V 10/147* (2022.01); *G06V 10/255* (2022.01); *G06V 10/36* (2022.01); *G06V 10/94* (2022.01); *H04N 25/131* (2023.01); *H04N 25/703* (2023.01); *H04N 25/708* (2023.01); *G06V 20/17* (2022.01)

(58) Field of Classification Search
CPC .. G06V 10/143; G06V 10/147; G06V 10/255; G06V 10/36; G06V 10/94; G06V 20/17; H04N 23/11; H04N 25/702
See application file for complete search history.

(56) References Cited

U.S. PATENT DOCUMENTS 7,860,344 B1 12/2010 Fitzpatrick et al.

OTHER PUBLICATIONS

Adomeit, U., and R. Ebert. "Improved target detection by IR dual-band image fusion." Electro-Optical and Infrared Systems: Technology and Applications VI. vol. 7481. SPIE, 2009. (Year: 2009).*

Hu, Mengya, et al. "Bernoulli generalized likelihood ratio test for signal detection from photon counting images." Journal of Astronomical Telescopes, Instruments, and Systems 7.2 (2021): 028006-028006. (Year: 2021).*

Mehmood, Asif, and Nasser M. Nasrabadi. "Wavelet-RX anomaly detection for dual-band forward-looking infrared imagery." Applied optics 49.24 (2010): 4621-4632. (Year: 2010).*

(Continued)

*Primary Examiner* — Amandeep Saini
*Assistant Examiner* — Denise G Alfonso
(74) *Attorney, Agent, or Firm* — Sand, Sebolt & Wernow LPA; Gary McFaline

(57) ABSTRACT

A passive sensor having a focal plane array with a plurality of pixels captures at least one dual band image. A generalized likelihood ratio test can be applied to the dual band imagery using intermediate images and image kernels or filters to approximate signal detections rather than performing a brute force approach. Further, the approach enables for the determination of detections in a plurality of sub-pixel locations.

20 Claims, 5 Drawing Sheets

(56) References Cited

OTHER PUBLICATIONS

Rivkin, Paul D. "Signal processing of infrared dual-band data." Signal and Data Processing of Small Targets 1993. vol. 1954. SPIE, 1993. (Year: 1993).*

Victor Golikov, Oleg Samovarov, Evgeniy Zhilyakov, Jose L. Rullan-Lara and Hussain Alazki; Generalized likelihood ratio test for optical subpixel objects' detection with hypothesis-dependent background covariance matrix; Paper 200662 received Sep. 5, 2020; accepted for publication Nov. 17, 2020; published online Dec. 2, 2020.

* cited by examiner

GENERALIZED LIKELIHOOD RATIO TEST FOR DUAL BAND IMAGERY

TECHNICAL FIELD

The present disclosure relates generally to the field of object detection using imagery. More particularly, the present disclosure relates to performing a generalized likelihood ratio test for dual-band imagery.

BACKGROUND

Detecting dim point sources in noisy imagery is a difficult. Typically, one detection technique accounts for the spreading signal of the source over multiple pixels and exhibits a constant false alarm rate. A sub-pixel generalized likelihood ratio test (GLRT) detector that uses the sensor Point Spread Function (PSF) would exhibit both of these properties. This tends to take processing time to calculate as well as large and expensive processing capability, so will not be suitable for real-time execution on large-format multi-spectral cameras or image sensors unless it can be made significantly more efficient.

While there is prior research on applying the GLRT detection technique to imagery to detect point sources, it is generally focused on estimating performance in ideal conditions on a small sample of images.

One exemplary problem is associated with computations that need to calculate a detection that would normally be quite computationally-intensive to calculate or determine. A GLRT is a statistical processing which enables a function to utilize the statistical information of an object and the background in an image relative to the object. The GLRT is a detection technique that can be used to provide a result in relation to a false alarm rate. Stated otherwise, the GLRT, in the general sense, is an optimized detection technique.

GLRT techniques may be used in association with infrared cameras or image sensors to detect a source of light detected by the focal plane array of the image sensor. The source can be anything that is desired to be detected, regardless of whether it is a threat or non-threat. Effectively, the source can be any source of light that is slightly brighter than, or slightly different than, the background in an image. Ordinarily, the GLRT technique is applied to every pixel on the focal plane array in the imager or image sensor. Because there is often many pixels on each focal plane array, this requires significant processing power and computation. Effectively, this processing requirement is often much more than current computing powers are able to provide when real-time analysis is required. Take, for example, when a calculation is needed to perform an operation in a camera or image sensor that has generated an image. In this example, assume the pixels are of a size that is 1,000×1,000. In order to do a brute force calculation on each pixel, one million calculations must be performed (1,000×1,000=1,000,000). In order to accomplish this, computer code would be written that effectuates execution from instructions to indicate for each pixel in an image, perform a function for each value of each pixel. In this example, the exemplary function could be multiplying the value of each pixel times 10. Then this would loop through one million times for each pixel. As can be readily understood, this is a slow brute force approach.

With respect to dual band imagery, the issue has greater complexity. The complexity is greater for dual band imagery because the two bands are generally strongly correlated, such that the computation of the GLRT requires inverting a 2×2 covariance matrix for each pixel pair, which increases the computational complexity by more than a factor of two.

SUMMARY

To address this problem and processing requirements that otherwise preclude or otherwise inhibit real-time evaluation utilizing a GLRT technique, the present disclosure provides a system and method for improving a GLRT technique by filtering the image in a manner that can be exploited and computed across the entire image to take advantage of the processor architecture to perform parallel vector processing. This calculates the result much faster than the brute force GLRT technique that was previously required.

The present disclosure relates to the techniques and applications for applying a generalized likelihood ratio test for dual-band imagery through the use of intermediate images that are functions of image kernels to result in detection estimations, as well as sub-pixel detection locations, that allow processing to occur in parallel rather than a serial brute force approach that requires significantly more processing power and time.

To address the cost and efficiency problems associated a sub pixel GLRT detector that uses the sensor PSF, the present disclosure provides a reformulation of the GLRT calculations into a minimal set of kernel operations that can be calculated over the image array efficiently. This allows for real-time execution to thereby increase the efficiency of the operation.

The present disclosure solves these problems and other problems by improving computer processing techniques by taking advantage of the computer processor's ability to perform parallel computations to run or execute the computations in parallel. To perform the parallel processing, the present disclosure effectuates the execution of operations via a matrix. Stated otherwise, computer readable instructions, when executed by the processor, perform operations to utilize matrix-based functions to perform parallel processing as described in greater detail herein. One exemplary function is provided by computer vision or other image processing instructions, which are functions to perform the calculations across the entire image at one time or at once. This is on orders magnitude faster than the previous brute force processing techniques because the present disclosure takes advantage of the processor architecture to do many of the exemplary calculations, for example multiply the pixel by 10, calculations simultaneously. In some embodiments, the present disclosure may not perform all of the computations simultaneously but the processor can chunk them together into groups that can be done simultaneously. Even by grouping or chunking processing groups together, the system and method of the present disclosure is able to effectuate improved processing techniques for image analysis.

In one aspect, an exemplary embodiment of the present disclosure may provide a method including obtaining a dual band image from a passive image sensor having a focal plane array carried by a platform; performing a GLRT on the dual band image, wherein performing the GLRT is accomplished by defining a plurality of intermediate images and performing operations for the intermediate images across the dual band image in parallel at one time; and determining whether a detection representing an object of interest is present in the dual band image in response to a result from performing operations for the intermediate images across the dual band image in parallel at one time. This exemplary embodiment or another exemplary embodiment may additionally include defining an image kernel h; and generating a plurality of intermediate images, each intermediate image being a function of the image kernel h and variance or covariance frames. This exemplary embodiment or another exemplary embodiment may additionally include wherein the plurality of intermediate images is five intermediate images. This exemplary embodiment or another exemplary embodiment may additionally include wherein the value of the image kernel h is of a known signal shape based on a point spread function. This exemplary embodiment or another exemplary embodiment may additionally include generating a plurality values of representing unknown signal intensity (I) in a first band and a second band. This exemplary embodiment or another exemplary embodiment may additionally include differentiating with respect to I and setting that differentiation equal to zero. This exemplary embodiment or another exemplary embodiment may additionally include substituting functions representing each of the five intermediate images for I, wherein substitution establishes a most likely value of I as a function of the plurality of intermediate images. This exemplary embodiment or another exemplary embodiment may additionally include calculating a maximum log likelihood ratio after having substituted the functions representing each of the plurality of intermediate images for I. This exemplary embodiment or another exemplary embodiment may additionally include determining whether a maximum log likelihood ratio is differs from a threshold in a manner to be considered different enough from background in the image to indicate the detection. This exemplary embodiment or another exemplary embodiment may additionally include repeating the generation of the plurality of intermediate images a number of times (n) with different image kernels (h) that represent n sub-pixel locations for each pixel of the FPA. This exemplary embodiment or another exemplary embodiment may additionally include wherein n equal four such that four sub-pixel locations are utilized. This exemplary embodiment or another exemplary embodiment may additionally include indicating the detection being located at one of sub-pixel locations when a maximum log likelihood ratio exceeds a threshold at that sub-pixel location.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
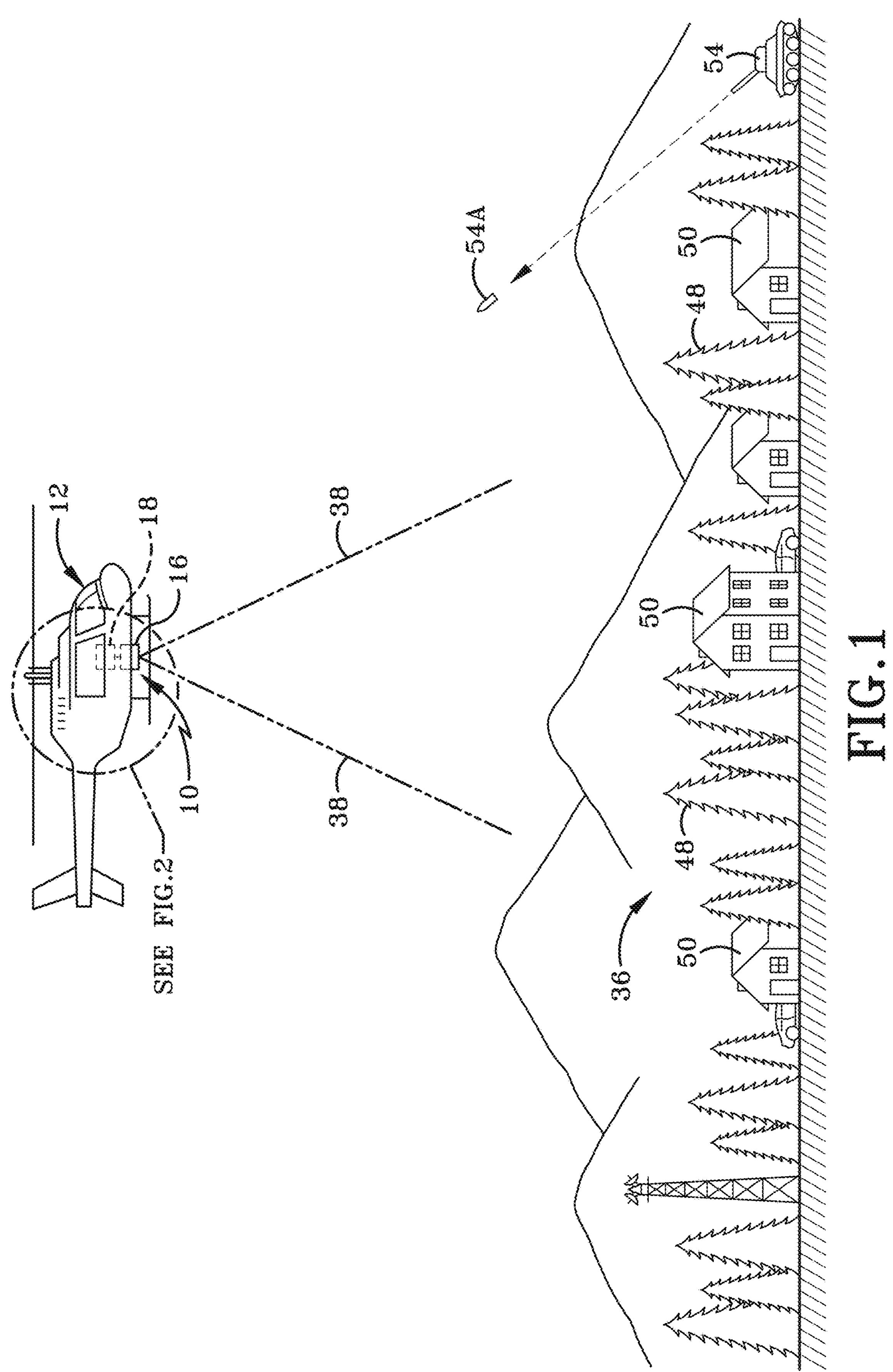
FIG. 1 (FIG. 1) is a diagrammatic view of a platform carrying an exemplary object detection system of that implements a GLRT technique on dual band imagery according to the present disclosure while traveling over an environment in which a field of view from at least one passive sensor is directed towards a geographic landscape.

FIG. 1 diagrammatically depicts a detection system for a kernel-based dual-band Generalized Likelihood Ratio Test (GLRT) detector and technique in accordance with certain aspects of the present disclosure and is shown generally at 10. The detection system 10 in this example is operably engaged with a platform 12 and includes at least one image sensor 16, at least one processor 18, spectral data logic 20, spatial data logic 22, GLRT logic 24, and registration logic 26.

In accordance with one aspect of the present disclosure, the platform 12 may be any moveable platform configured to be elevated relative to a geographic landscape 36. Some exemplary moveable platforms 12 include, but are not limited to, unmanned aerial vehicles (UAVs), manned aerial vehicles, projectiles, guided projectiles, or any other suitable moveable platforms.

When the platform 12 is embodied as a moveable aerial vehicle, the platform 12 may include a front end or a nose opposite a rear end or tail. Portions of the detection system 10 may be mounted to the body, the fuselage, or internal thereto between the nose and tail of the platform 12. While FIG. 1 depicts that some portions of the detection system 10 are mounted or carried by the platform 12 adjacent a lower side of the platform 12, it is to be understood that the positioning of some components may be varied and the figure is not intended to be limiting with respect to the location of where the components of the system 10 are provided. For example, and not meant as a limitation, the at least one sensor 16 is mounted on the platform 12. Furthermore, some aspects of the at least one sensor 16 may be conformal to the outer surface of the platform 12 while other aspects of the at least one sensor 16 may extend outwardly from the outer surface of the platform 12 and other aspects of the at least one sensor 16 may be internal to the platform 12.

The at least one sensor 16 may be a passive sensor. One exemplary passive sensor is an optical sensor mounted on the lower side of the platform 12. The at least one sensor 16 is configured to observe scenes remote from the platform 12, such as, for example, a geographic landscape 36 within its field of view (FOV) 38. Inasmuch as the at least one sensor 16 has a FOV 38, and in one example, the at least one sensor 16 is an image sensor or imager. Further, when the at least one sensor 16 is embodied as an imager, the imager may be any imager capable of imaging terrain, such as, for example, a visible light imager, infrared (IR), a near-infrared imager, a mid-infrared imager, a far-infrared imager, or any other suitable imager. In one example, the imager has a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate.

The at least one sensor 16, which may be an IR imager, being a passive sensor 16 or imager refers to the at least one sensor 16 or the imager configured to view/receives data observed through its FOV 38 of the scene that is being observed, but does not actively produce or generate a source of energy that propagates outward from the sensor to there-after obtain a received signal (such as that would be common with an active sensor, such as LIDAR or radar).

Sensor 16 may be one of many sensors on platform 12, such as a plurality of IR sensors or IR imagers, each including at least one focal plane array (FPA). Each FPA comprises a plurality of pixels. The IR sensors are able to detect spectral wavelengths. In this present disclosure, the IR sensors are capable of detecting multiple wavelengths in the visible and/or nonvisible spectrum of light.

The data or information from pixels that form one image have a spatial orientation relative to other pixels. Adjacent pixels in an image typically have shared or common information to an adjacent pixel in the overall image. The use of spatial data as referred to herein, refers to spatial data in the image. Thus, the present disclosure uses information in an image near a particular pixel to perform the GLRT calculations, classification, decision, or determination of a candidate object at that pixel or an adjacent pixel.

Furthermore, when the at least one sensor 16 is embodied as an imager, the imager will have some components that are common to image sensors such as lens, domes, focal plane arrays, and may additionally include processors such as a Graphical Processing Unit (GPU), which may be an exemplary processor 18, and associated processing hardware. Towards that end, a reader of the present disclosure will understand that the at least one sensor 16 may include standard imaging components adapted to sense, capture, and detect imagery within its FOV 38. The imagery may be in a spectrum that is not viewable to the human eye, such as, for example, near-infrared imagery, mid-infrared imagery, and far-infrared imagery. However, one particular embodiment of the present disclosure utilizes IR imagery.

While the FOV 38 in FIG. 1 is directed vertically downward towards the geographic landscape 36, it is further possible for a system in accordance with the present disclosure to have a sensor 16 that projects its FOV 38 outwardly and forwardly from the nose of the platform 12 or outwardly and rearward from the tail of the platform 12, or in any other suitable direction. However, as will be described in greater detail below, certain implementations and embodiments of the present disclosure are purposely aimed downward so as to capture a scene image from the geographic landscape 36 to be used to provide navigation and/or position and/or location and/or geolocation information to the platform 12.

Generally, the sensor 16 has an input and an output. An input to the sensor 16 may be considered the scene image observed by the FOV 38 that is processed through the imagery or sensing components within the sensor 16. An output of the sensor may be an image captured by the sensor 16 that is output to another hardware component or processing component.

Figure 2:
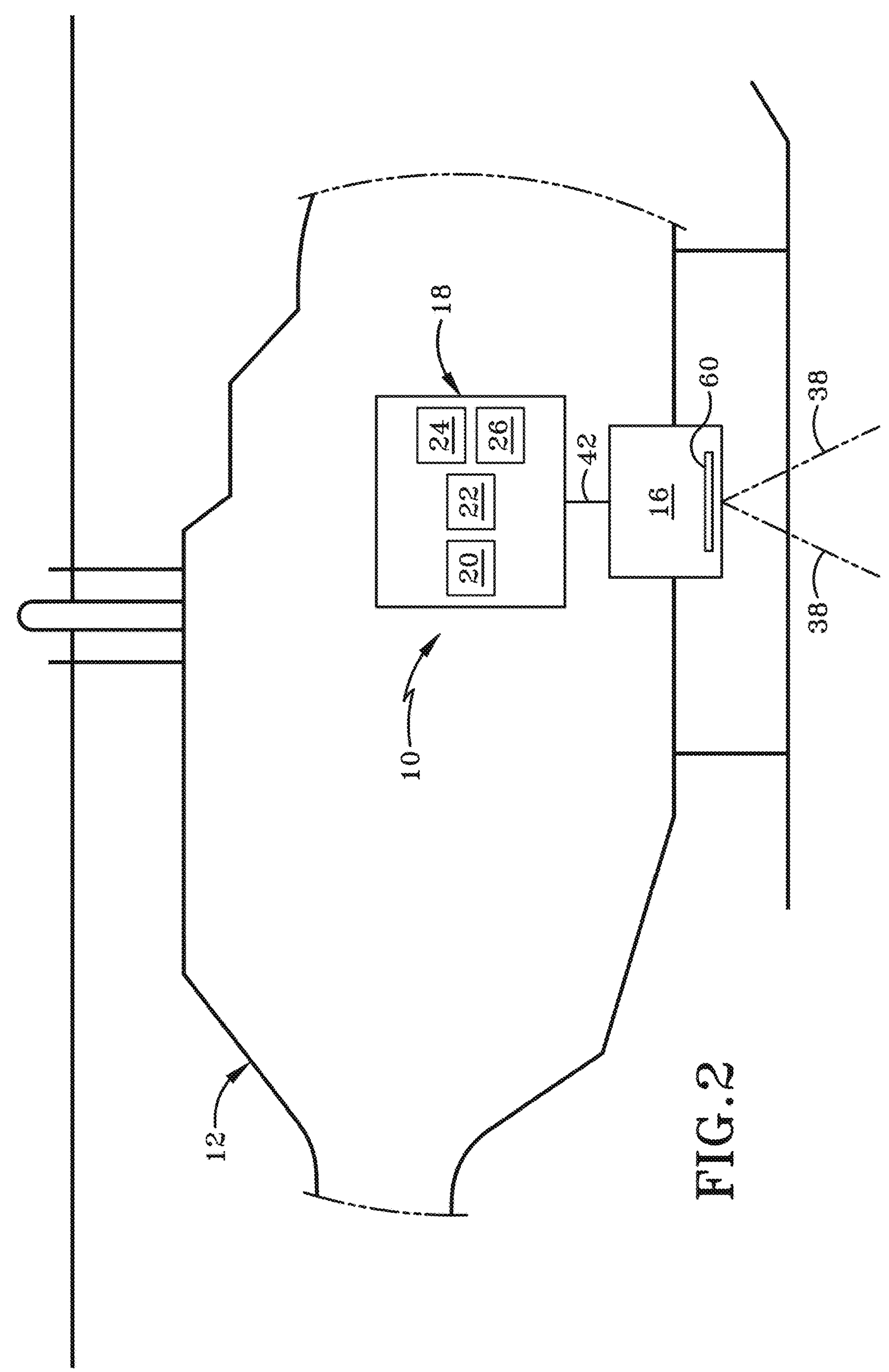
FIG. 2 (FIG. 2) is an enlarged schematic view of a portion of the platform carrying the detection system as highlighted by the dashed circle labeled "SEE FIG. 2" from FIG. 1

FIG. 2 depicts the at least one processor 18 is in operative communication with the at least one sensor 16. More particularly, the at least one processor 18 is electrically connected with the output of the sensor 16. In one example, the at least one processor 18 is integrally formed within sensor 16. In another example, the processor 18 is directly wired to the output of the sensor 16. However, it is equally possible for the at least one processor 18 to be wirelessly connected to the sensor 16. Stated otherwise, a link 42 electrically connects the sensor 16 to the at least one processor 18 (which may be entirely physically internal to the housing associated with sensor 16) and may be any wireless or wired connection, integral to the sensor 16 or external to sensor 16, to effectuate the transfer of digital information or data from the sensor 16 to the at least one processor 18. The at least one processor 18 is configured to or is operative to generate a signal in response to the data received over the link 42 from the sensor 16.

In accordance with one aspect of the present disclosure, the processor 18 may be a GPU that is performing the processing functionality to perform the GLRT calculation technique described herein, which may be a portion of a threat warning or countermeasure method or process. The GPU may be located on the platform or it may be located at a remote location separated from the platform, wherein when the GPU is at a remote location wireless signal transmission logic would be present on the platform to send the signal data to a receiver that feeds the signal data to the GPU for processing.

In some implementations, the data that is sent over the link 42 are scene images or video streams composed of sequential frames captured by the sensor 16 that is observing the geographic landscape 36 below through its FOV 38. As will be described in greater detail below, the at least one processor 18 may include various logics, such as, for example, spectral data logic 20, spatial data logic 22, GLRT logic 24, and registration logic 26, which performs functions described in greater detail herein.

With continued reference to FIG. 1, and having thus described the general structure of system 10, reference is now made to features of the geographic landscape 36. For example, and not meant as a limitation, the geographic landscape 36 may include natural features 48, such as trees, vegetation, or mountains, or manmade features 50, such as buildings, roads, or bridges, etc., which are viewable from the platform 12 through the FOV 38 of the sensor 16. Also within the FOV 38 is a candidate object 54, which may be a threat or another object of interest. System 10 is configured to detect the object 54 or projectile 54A from dim point sources in noisy imagery using sub-pixel GLRT detections that use sensor point spread functions.

The system 10 uses the sensor 16 to capture a scene image from a scene remotely from the platform 12 and the at least one processor 18 generates a signal in response to the sensor 16 capturing the scene image. Metadata may be provided for each captured scene image. For example, and not meant as a limitation, the metadata may include a frame number of the scene image within a flight data set, a latitude position of the platform 12 in radians, a longitude position of the platform 12 in radians, an altitude position of the platform 12 in meters, a velocity of the platform 12 in meters per second, and a rotation of the platform 12 in degrees. Metadata associated with the at least one sensor 16 may also be provided, such, as, for example, mounting information related to the at least one sensor 16. Although examples of metadata have been provided, it is to be understood that the metadata may include any suitable data and/or information.

Spectral data logic 20 may be in operative communication with at least one non-transitory computer readable storage medium having instructions encoded thereon that, when executed by the at least one processor 18, implements operations to obtain a single band or multiple bands (i.e. multichannel-different parts of the infrared spectrum) of image data depicting object 54 or projectile 54A that are captured together in an image or in a frame of a video stream from the sensor 16.

Spatial data logic 22 may be in operative communication with at least one non-transitory computer readable storage medium having instructions encoded thereon that, when executed by the at least one processor 18, implements operations to determine the spatial locality or spatial position of a candidate object 54 or projectile 54A relative to a pixel on the focal plane array within image data from an image or from a frame of a video stream from the sensor 16.

GLRT logic 24 may be in operative communication with at least one non-transitory computer readable storage medium having instructions encoded thereon that, when executed by the at least one processor 18, implements operations to perform sub-pixel GLRT detections using the point spread function (PSF) techniques described herein.

The registration logic 26 may be in operative communication with at least one non-transitory computer readable storage medium having instructions encoded thereon that, when executed by the at least one processor 18, implements operations to register the GLRT calculation, decision, or determination.

The logic blocks 20, 22, 24 and 26 are described herein as separate blocks, however in one embodiment these blocks represent modules within a program and are processed by the at least one processor 18.

Figure 3:
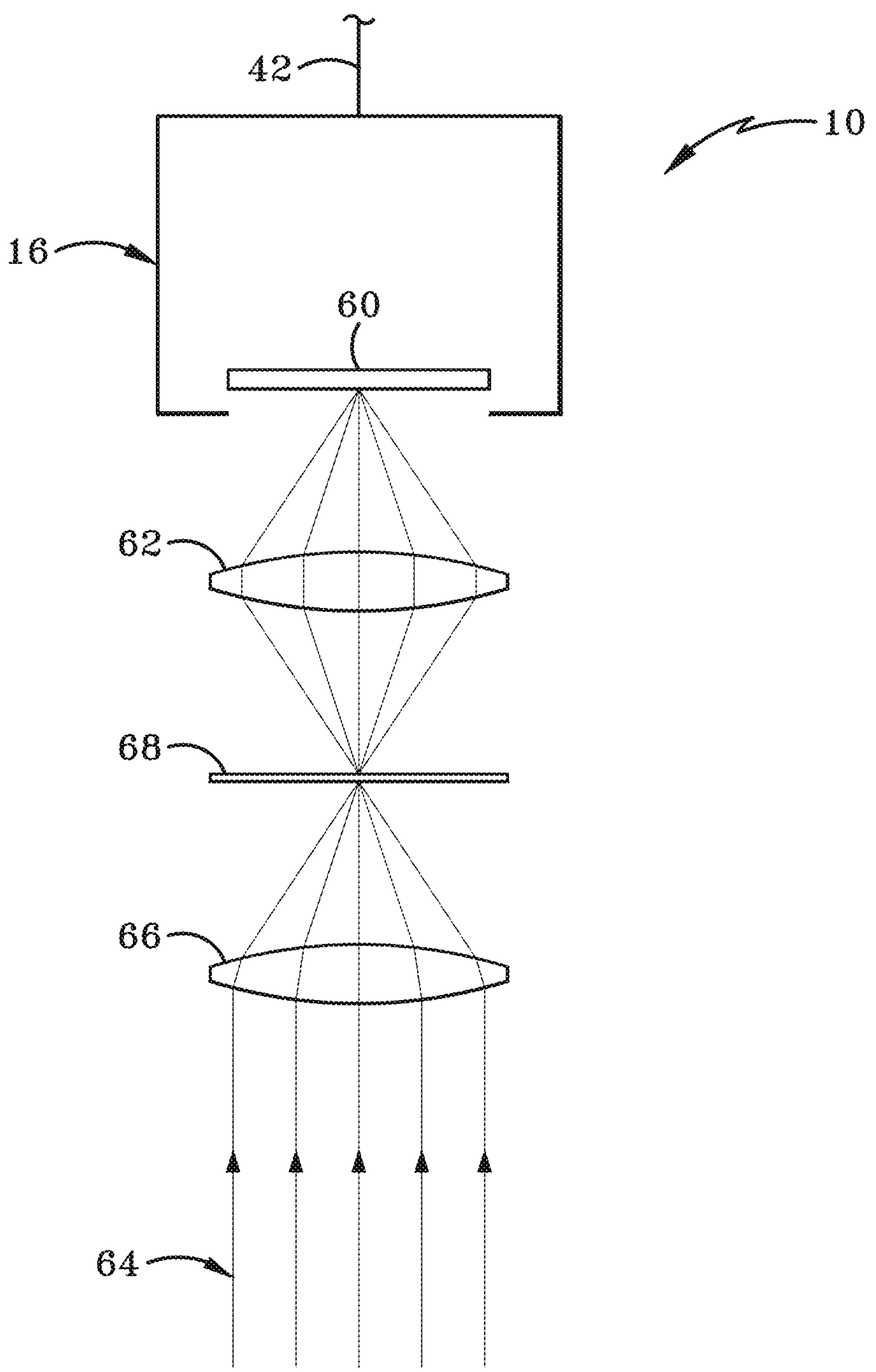
FIG. 3 (FIG. 3) is a schematic view of the passive sensor.

FIG. 3 diagrammatically depicts portions of the exemplary system 10 within an optical objective according to the principles of the present disclosure. More specifically, in one embodiment of the imager 16 comprises a focal plane array (FPA) 60. An FPA is an image sensing device consisting of an array of light-sensing pixels at the focal plane of a lens 62. FPAs are used most commonly for imaging purposes, but can also be used for non-imaging purposes such as spectrometry, LIDAR, and wave-front sensing. At optical and infrared wavelengths, an FPA can refer to a variety of imaging device types, but in common usage an FPA refers to two-dimensional devices that are sensitive in the infrared spectrum. Devices sensitive in other spectra are usually referred to by other terms, such as CCD (charge-coupled device) and CMOS image sensor in the visible spectrum, for example.

FPAs operate by detecting photons at particular wavelengths and then generating an electrical charge, voltage, or resistance in relation to the number of photons detected at each pixel. This charge, voltage, or resistance is then measured, digitized, and used to construct an image of the object 54, projectile 54A, scene, or phenomenon (generally, the landscape 36) that emitted the photons. Applications for infrared FPAs include missile or related weapon guidance sensors, infrared astronomy, manufacturing inspection, thermal imaging, medical imaging, and infrared phenomenology (such as observing combustion, weapon impact, rocket motor ignition and other events that are interesting in the infrared spectrum), and the like.

Still referring to FIG. 3, the imager 16 and its FPA 60 receive and process incoming radiation from the landscape 36 that may include object 54 or projectile 54A. The incoming radiation 64 from landscape 36 may be reflected off of a moving object and/or terrain and pass through one or more lenses 62, 66 before reaching the FPA 60. In one embodiment, a first lens 66 focusses the incoming radiation from the scene landscape 36 onto a filter assembly 68. In some cases, the filter assembly 68 comprises a plurality of filter sets on a thin (e.g., 0.5 to 2.0 mm) substrate such as BK7, in the visible band, or Geranium, in the LWIR band. The substrate for the filter sets 68 can be any optically compatible material in the band of interest that is also compatible with the filters. In some cases, the filter assembly 68 is movable about the focal point. In certain embodiments, each filter set 68 could be sized for a pixel set depending on the target of interest and objective optics in the system.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Having thus described the components of the image sensor 16, reference will be made to its operation to perform the methods associated with the system to implement GLRT calculations into a minimal set of kernel operations that can be calculated over the entire image array or the FPA 60, efficiently. In one particular exemplary embodiment, applications of this technique provide advantages when used with dual band imagery obtained from one sensor 16 capable of acquiring dual band images of a scene or landscape 36

Previous techniques provided for the application of GLRT techniques to single band imagery. Under previous teachings, the dual band imagery would typically make the detection process more complicated because in order to perform the GLRT with two images, the system would need to include the covariance between the two images. In the previous techniques, the GLRT needed to be given the statistics of the image around the local area of interest, the system needed to determine how bright it would have to be so that it would be statistically different from the background. Thus, the noise associated with the background was taken into account. If the background was more noisy, then the point source needed to be brighter to detect. Thus, if there were two colors or two bands of interest, the system was not only asking if the point source was different from the background but also if it was different in both images. Also accounted for was whether the spectral ratio was different in both images. This covariance took into account the statistics of both imagers/cameras separately and the cross correlation between the two cameras for each pixel. Thus, the calculations were much more complicated and made the computations much more difficult.

In accordance with an aspect of the present disclosure, the system 10 provides a unique solution to apply a GLRT technique to dual band imagery. Thus, one exemplary feature of the present disclosure enables a GLRT technique to be executed on dual band imagery. This technique also detects point sources at sub-pixel locations in dual-band imagery using the GLRT technique using image filtering, which are also referred to herein as an image kernel or kernels h.

Generally, to compute the GLRT the system must find the maximum of the log likelihood ratio and compare to a threshold:

$$\log\Lambda = \log\left(\frac{e^{-\frac{1}{2}(z-Ih)^T C^{-1}(z-Ih)}}{e^{-\frac{1}{2}z^T z}}\right) > \gamma \qquad \text{(Equation 1)}$$

The image kernel h is a matrix of numbers that define the calculations that need to be performed on the pixels. The kernel h is what is provided into the parallel function processing that processes the kernels in parallel across the entirety of the image. The GLRT function to obtain log Λ (Equation 1) is the standard definition of a likelihood ratio for the ratio of the signal that is expected divided by the signal expected if there is nothing present. If this is greater than the threshold y (Equation 1), then the log Λ is provided.

For a given pixel on the FPA 60, this technique formulates the log likelihood ratio for the a region around a particular pixel, such as 3×3 pixel region, as:

$$\log\Lambda = -\frac{1}{2}\sum_{i,j}(z_{i,j} - Ih_{i,j})^T C^{-1}(z_{i,j} - Ih_{i,j}) + \frac{1}{2}\sum_{i,j} z_{i,j}{}^T C^{-1} z_{i,j} \quad \text{(Equation 2)}$$

Where:

$$z_{i,j} = \begin{bmatrix} z_{i,j}^{b1} \\ z_{i,j}^{b2} \end{bmatrix}$$

is the measured signal in bands 1 and 2;

$$I = \begin{bmatrix} I^{b1} \\ I^{b2} \end{bmatrix}$$

is the unknown signal intensity in bands 1 and 2;

$$h_{i,j} = \begin{bmatrix} h_{i,j} \\ h_{i,j} \end{bmatrix}$$

is the known signal shape based on the point spread function; and $$C^{-1} = \begin{bmatrix} a_{i,j} & b_{i,j} \\ b_{i,j} & d_{i,j} \end{bmatrix}$$

is the inverse of the (known) band1/band2 covariance matrix.

Equation 2 applies the logarithm of Equation 1 and converts it into the sum of the region which in this case is a 3×3 region around a particular pixel. However, it is to be understood that the size of the region surrounding the particular pixel can be selected by the designer of the system to meet the application specific needs of the processing technique of the present disclosure.

The most likely values of the unknown signal intensity in band 1 ($I_{b1}$) and of the unknown signal intensity in band 2 ($I_{b2}$) are found by differentiating with respect to I and setting equal to zero, resulting in:

$$\begin{bmatrix} I^{b1} \\ I^{b2} \end{bmatrix} = \frac{1}{\left(\sum_{i,j} h^2 a\right)\left(\sum_{i,j} h^2 d\right) - \left(\sum_{i,j} h^2 b\right)^2} \begin{bmatrix} \sum_{i,j} h^2 a & -\sum_{i,j} h^2 b \\ -\sum_{i,j} h^2 b & \sum_{i,j} h^2 d \end{bmatrix} \begin{bmatrix} \sum_{i,j} h(z_{b1} a + z_{b2} b) \\ \sum_{i,j} h(z_{b1} b + z_{b2} d) \end{bmatrix} \quad \text{(Equation 3)}$$

Equation 3 represents that, for a given pixel, the system determines what the most likely intensity is that results in the 3×3 region around that pixel. This sum is around the 3×3 pixel center and defines a local value.

The present disclosure improves upon Equation 3 and provides a specific computer-centric improvement to the previous computer-specific problem of requiring processing through the entire image and calculating all of the sums of a region, such as a 3×3 region, around the particular pixel, for every pixel of the image, by way of a brute force approach. The computer-centric improvement provided by the system of the present disclosure defines several operations or intermediate images and performs operations for the intermediate images in parallel across the image at one time. This improvement results in increased processing efficiency by reducing processing power and increasing the speed at which the image can be processed. In one particular example, the present disclosure utilizes five operations to generate intermediate images and performs operations for the five intermediate images in parallel across the image at one time.

In the embodiment in which the operations are performed in parallel across the entire image at one time, the operations for the intermediate images are calculated across the entire m×n image using kernel h, generating, via GLRT logic 24, five intermediate images F1, F2, F3, F4, and F5:

$$F_1 = (h)^2 * a$$

$$F_2 = (h)^2 * b$$

$$F_3 = (h)^2 * d$$

$$F_4 = h * (z_{b1} a + z_{b2} b)$$

$$F_5 = h * (z_{b1} b + z_{b2} d)$$

(Equations 4-8, respectively)

Where $z_{b1}$ and $z_{b2}$ are the full m×n dual-band image frames, and a, b, and d are m×n variance and covariance frames. Where m×n represents the pixels size of the image frame. For example, if m=1000 and n=1000, then there would be 1,000,000 pixels.

Notably, while five intermediate images F1, F2, F3, F4, and F5 are discussed herein, it may be possible to have fewer or more intermediate images. In one particular embodiment, there are five intermediate operations that generate five intermediate images F. There is a first intermediate image F1 (defined by Equation 4), a second intermediate image F2 (defined by Equation 5), a third intermediate image F3 (defined by Equation 6), a fourth intermediate image F4 (defined by Equation 7), and a fifth intermediate image F5 (defined by Equation 8). As shown in Equations 4-8 for the five intermediate images, F1-F5, the value of h is an image kernel representative of the known signal shape based on a point spread function. In image processing, an image kernel (which may also be known as convolution matrix or mask) is a small matrix used for blurring, sharpening, embossing, edge detection, and more. This is accomplished by doing a convolution between the kernel and an image. Practically, h is representative of a blip or indication in the image identified by a blur circle in the image. Thus, the image kernel H is a numerical description of the blur circle in the image sensor or imager. In order to calculate the GLRT, the most likely values of I are needed. The present disclosure has determined that the most likely values of I can be broken out into the five intermediate images F1-F5.

Substituting in intermediate images F, I can now be calculated across the image as:

$$\begin{bmatrix} I^{b1} \\ I^{b2} \end{bmatrix} = \frac{1}{F_1F_3 - (F_2)^2} \begin{bmatrix} F_1 & -F_2 \\ -F_2 & F_3 \end{bmatrix} \begin{bmatrix} F_4 \\ F_5 \end{bmatrix} \quad \text{(Equation 9)}$$

The maximum likelihood ratio can then be calculated using this I and the same 5 intermediate images:

$$LR_{max} = \frac{1}{2}F_1 {I^{b1}}^2 + F_2 I^{b1} I^{b2} + \frac{1}{2}F_3 {I^{b2}}^2 + F_4 I^{b1} + F_5 I^{b2} \quad \text{(Equation 10)}$$

Equation 9 substitutes the intermediate images F1-F5 to establish the most likely values of I written as a function of the five intermediate images. This allows the system of the present disclosure to obtain the most likely values of I on the entire image at one time. This allows, instead of the brute force determination of the unknown signal intensity I, the system of the present disclosure to provide the kernels of the five intermediate images through the kernel operator (such as open CV) to generate entire images for 11 (unknown signal intensity in the first band) and 12 (unknown signal intensity in the second band). This results in knowing the most likely intensity for any pixel in the entire image. This processing occurs significantly faster than the brute force techniques.

The maximum likelihood ratio (Equation 10) can also be expressed in terms of the signal intensities I and the five intermediate images F1-F5. The maximum likelihood ratio refers to the log Λ equaling the log likelihood ratio given a signal intensity I. The maximum likelihood ratio is the maximum of Equation 1 (log Λ) with respect to I. To find the maximum likelihood, the derivative is taken and set to zero to result in the maximum. Essentially, the equation is determining what intensity that best matches what has been observed. The system of the present disclosure then determines whether that intensity is different enough from the background to indicate a detection. Thus, the system finds the maximum likelihood ratio and then plugs it back in to the original log Λ (Equation 1) and compares it to a threshold to determine if that pixel becomes a detection.

The maximum likelihood ratio (Equation 10) stands for the position that given the most likely intensity that has been derived, is the likelihood ratio greater than the threshold. This is another way of saying is the likelihood that there is a detection that is greater than the threshold that has been determined beforehand. Setting the threshold is set based on known detections by the system designer. For example, the system designer may know what the spectral threshold is for a detection associated with a threat, such as the flash of a rocket-propelled grenade or the spectral signature associated with a scattered minefield, or other objects of interest. If the background statistics are known, such as Gaussian noise, then the system designer can select the threshold that provides a certain false alarm rate. However, for real world practical application, tuning the threshold rate would likely be required to account for non-total Gaussian distributions.

One advantage of the present disclosure is that it does not necessarily require designation of which portion of the image needs to be evaluated because the entire image may be evaluated or provided to the function at one time. Stated otherwise, the entire image is evaluated at a single time, then a technique may be applied to go back after the analysis to determine whether there are any detections that are of interest since it was processed at once. Some exemplary detections have different spectral properties from the background of the image.

Figure 4:
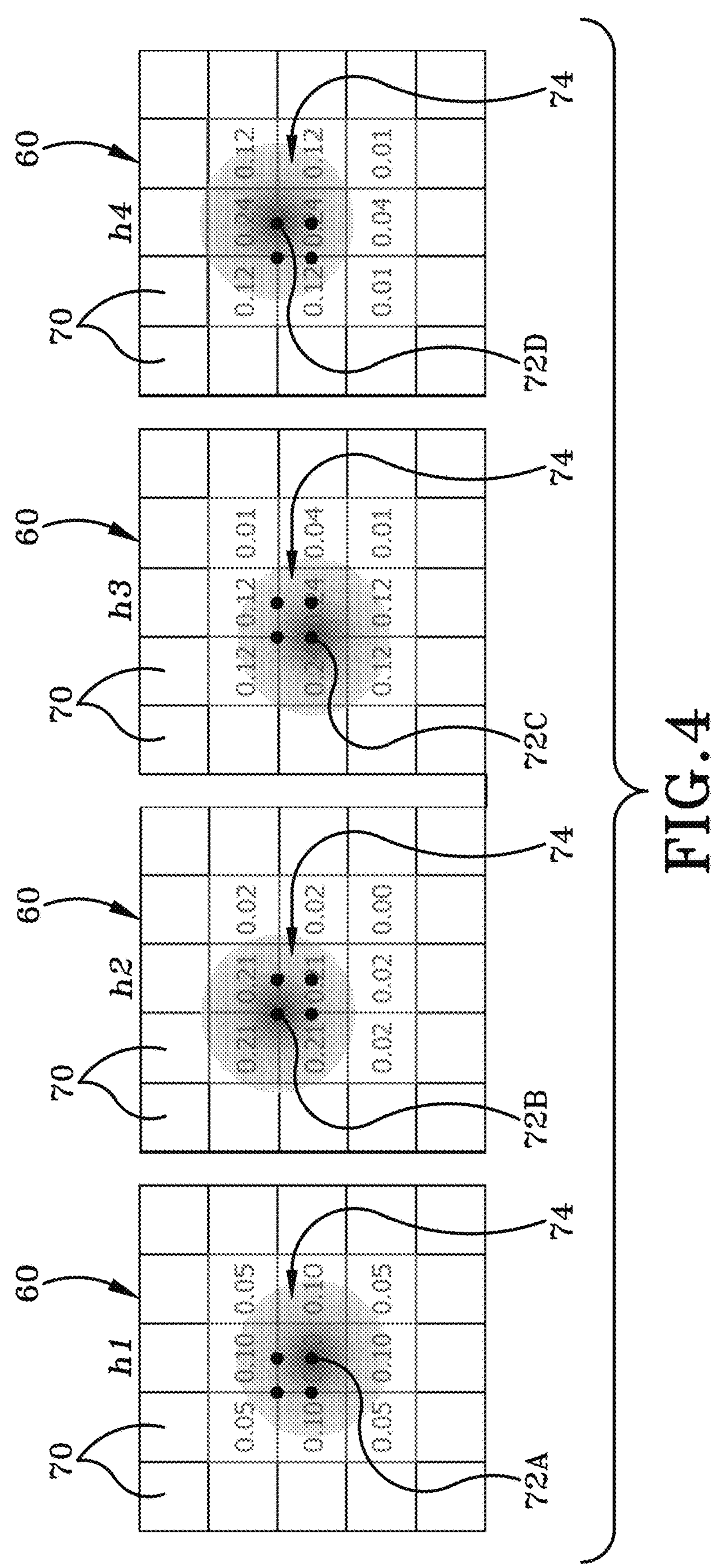
FIG. 4 (FIG. 4) is a diagrammatic view of four different partial pixel groups on a focal plane array that can be applied to four different time of kernel configurations.

FIG. 4 represents an exemplary process in which this process is repeated n number of times with different h matrices that represent n sub-pixel locations for each pixel 70 on FPA 60, and for this example n=4. Thus, there is shown a first kernel matric h1, a second kernel matrix h2, a third kernel matrix h3, and fourth kernel matrix h4. For each pixel 70 of FPA 60, if the maximum of the n likelihood ratio images are above a pre-defined threshold, a detection is indicated at that sub-pixel location, represented by dots 72A, 72B, 72C, and 72D. The intensity images $I_{b1}$ and $I_{b2}$ also give an estimate of the total source intensity in bands 1 and 2 for the detection. Within each kernel matrix h1-h4, there is the blur circle 74 or kernel-wise description of a blur circle relative to an array of pixels in the total focal plane array. In this example the blur circle 74 is spread out and covers a 3×3 array of pixels. Smaller and larger blur circles with corresponding arrays of pixels is a further example, In accordance with one aspect of the present disclosure, the system 10 and method described herein is a reformulation of the previously known GLRT techniques or formulations so that the GLRT calculation is turned into a series of image kernels or matrix operation that can be performed using efficient vectorized computation. Each image kernel is represented by one matrix. The image kernel h is the matrix and within each matrix, there is data from multiple pixels represented in each respective kernel. That matrix then, when executed, effectuates the parallel processing because multiple pixels 70 can be evaluated at a single time. In one particular example, the entire image may be provided to the source code. Then, the processor 18 is provided with the kernel h that the operator desires to be operated on the image. The function will then perform the operation at once.

FIG. 4 depicts each pixel 70 as a box in each respective h matrix. The center matrix is represented by pixel 3,3. Each of the h matrices is trying to detect the presence of the h blur circle 74 relative to the center pixel 3,3. In addition to the kernelization described herein, determining the center of each h matrix is an exemplary inventive embodiment of the present disclosure. Rather than assuming that the object of interest is in the center of each pixel 70, for example the center 72A of pixel 3,3 as indicated at matrix h1, the present disclosure enables, for each pixel, the center of the blur circle can be located in one of four subpixel locations (72A-72D). For example, it can be directly in the center 72A as indicated at h1, it can be in the corner of four pixels (dot 72B) as indicated at h2, it can be off to the side and straddle two pixels (dot 72C) as indicated at h3, or it can be shifted up to straddle two pixels (dot 72D) as indicated at h4. Further, while four subpixel locations 72A-72D are shown in this example, greater or fewer numbers of subpixel locations are further examples that would depend on the application specific needs of the technique.

The image kernels of the intermediate images F1-F5 are created for each of these blur circles 74 for h1-h4. Stated otherwise, for each of the five intermediate images F1-F5, each blur circle 74 is created for h1-h4, one for each blur circle H. This maximizes the detection probability and it increases the accuracy of the reconstructed intensity that is obtained. This is beneficial because if the source is not dead center in the pixel 70, it is acceptable because all of the energy is still detected because the system is using the kernels that are matched to those subpixel locations. Effectively, the system is able to detect objects at subpixel locations even though there are set or fixed pixel sizes. The system is able to execute the five intermediate functions F1-F5 using the four different h matrices in parallel. These h matrix kernels are performed over the entire image and plugged into each of the respective sub images or intermediate images F1-F5.

The value shown in the pixels 70 of each respective h matrix kernel represent the known signal shape based on the point spread function. These values are known from the imager or image sensor 16. These values are known based on, given a point source (an object at infinity) that has no actual size, how that energy spread across the focal plane for the image or image sensor. Every imager has its own optical blur that will be known in advance to perform the optimal performance of these functions. For example, in matrix h1 of FIG. 4, the center pixel corresponding to dot 72A has a value of 0.00 that represents the signal shape based on the point spread function. The four corner pixels of the 3×3 region around the center pixel have a value of 0.05 that represent the signal shape based on the point spread function. The four cardinal pixels located between the corner pixels surrounding the center pixel have a value of 0.1 that represents the signal shape based on the point spread function.

Once the calculations are performed, a subpixel location for a detection representing object 54 or projectile 54A is then known. With the subpixel location and an accurate intensity estimate that includes whether it is in the center of one pixel, straddling two pixels, or in the center of four pixels, it is still gathering all the intensity because of the 3×3 kernel, that information improves performance if those detections were passed to a tracker or a countermeasure defense system. These detections are provided to a tracker that is part of a threat warning system or a countermeasure system, with improved angle information from those detections and has intensity information that it can use to perform other functions. Thus, quantifying and calculating the subpixel intensity locations improves the performance any downstream algorithms that needs the location and intensity. This particular kernel-base technique enables real time processing on a platform.

Figure 5:
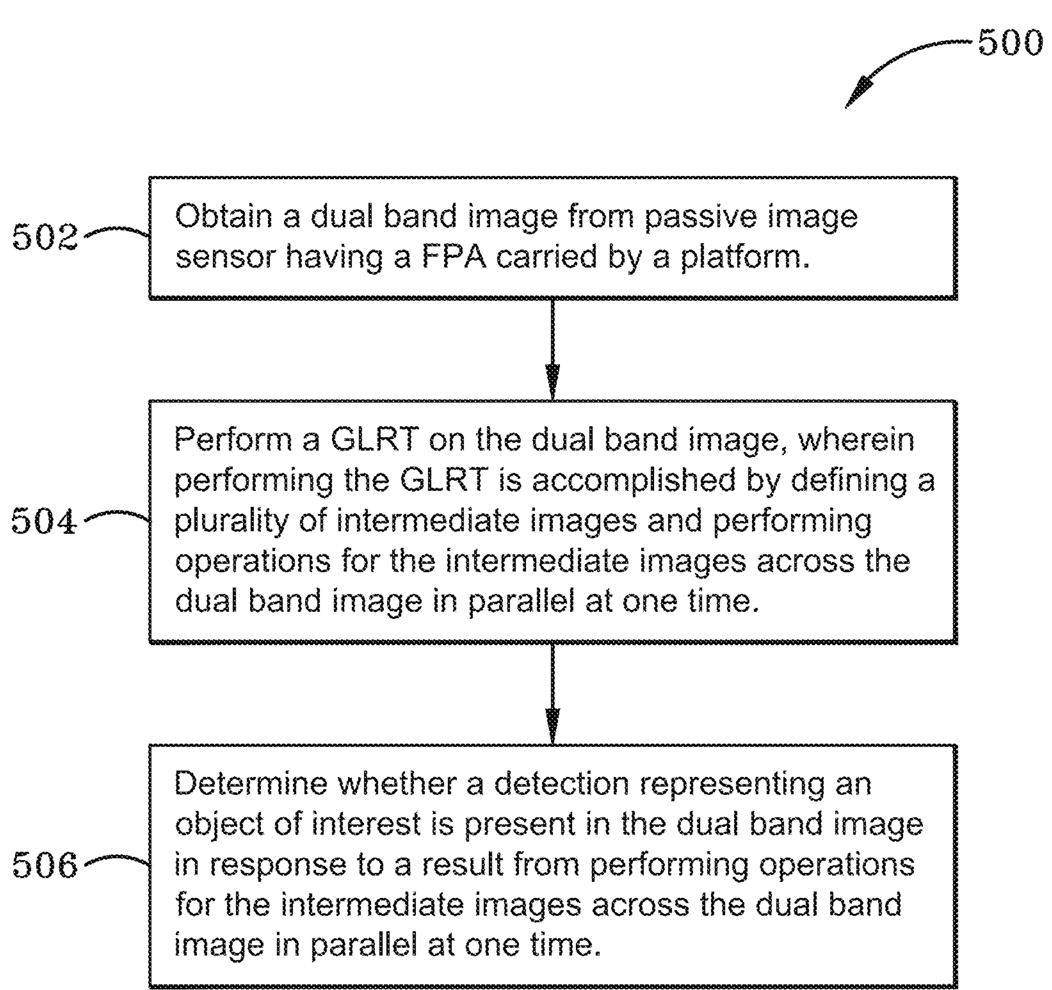
FIG. 5 (FIG. 5) is a flow chart according to an exemplary embodiment of a method according to the present disclosure.

FIG. 5 is a flow chart that represent an exemplary method 500 according to one exemplary aspect of the present disclosure. Method 500 includes obtaining a dual band image from passive image sensor 16 having a focal plane array (FPA 60) carried by platform 12, which is shown generally at 502. For example, Step 502 can obtain an image through passive image sensor 16 and its FPA 60 by receiving and processing incoming radiation from the landscape 36 that may include object 54 or projectile 54A.

Method 500 includes performing a GLRT on the dual band image that is modified according to the techniques or processes discussed herein wherein performing the GLRT is accomplished by defining a plurality of intermediate images and performing operations for the intermediate images across the dual band image in parallel at one time, which is shown generally at 504. For example, the operations of functions (Equations 4-8) for the intermediate images, for example the five intermediate images F1-F5, are calculated across the entire m×n image using kernel h, generating, via GLRT logic 24.

Step 504 utilizes the value of h, which is an image kernel representative of the known signal shape based on a point spread function. Step 504 may obtain the most likely values of I to calculate the GLRT, which the present disclosure has determined that the most likely values of I can be broken out into the five intermediate images F1-F5. To calculate the most likely values of I, Step 504 may substitute the intermediate images F, such as F1-F5 to obtain Equation 9. Step 504 uses Equation 9 to calculate the maximum likelihood ration via Equation 10 that incorporates the intermediate images. Equation 9 substitutes the intermediate images F1-F5 to establish the most likely values of I written as a function of the five intermediate images. Step 504 enables method 500 to obtain the most likely values of I on the entire image in parallel at one time. This allows method 500 to provide the kernels of the five intermediate images through the kernel operator (such as open CV) to generate entire images for 11 (unknown signal intensity in the first band) and 12 (unknown signal intensity in the second band), instead of the brute force determination of the unknown signal intensity I, the system of the present disclosure. This results in method 500 determining the most likely intensity for any pixel in the entire image.

The maximum likelihood ratio (Equation 10) can also be expressed in terms of the signal intensities I and the five intermediate images F1-F5. The maximum likelihood ratio refers to the log Λ equaling the log likelihood ratio given a signal intensity I. The maximum likelihood ratio is the maximum of Equation 1 (log Λ) with respect to I. To find the maximum likelihood, the derivative is taken and set to zero to result in the maximum. Essentially, the equation is determining what intensity that best matches what has been observed. The system of the present disclosure then determines whether that intensity is different enough from the background to indicate a detection. Thus, the system finds the maximum likelihood ratio and then plugs it back in to the original log Λ (Equation 1) and compares it to a threshold to determine if that pixel becomes a detection.

Method 500 includes determining whether a detection representing an object of interest (such as object 54 or projectile 54A) is present in the dual band image in response to a result from performing operations for the intermediate images across the dual band image in parallel at one time, which is shown generally at 506.

More particularly, Step 506 determines whether the maximum likelihood ratio (Equation 10), for a given most likely intensity that has been derived, is the likelihood ratio greater than the threshold. Step 506 can therefore determine that the likelihood that there is a detection is greater than the threshold. Prior to Step 506, the threshold is set based on known detections by the system designer. For example, the system designer may know what the spectral threshold is for a detection associated with a threat, such as the flash of a rocket-propelled grenade or the spectral signature associated with a scattered minefield, or other objects of interest. If the background statistics are known, such as Gaussian noise, then the system designer can select the threshold that provides a certain false alarm rate.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms “program” or “software” or “instructions” are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

“Logic”, as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:

obtaining a dual band image from a passive image sensor having a focal plane array (FPA) carried by a platform, wherein the dual band image contains a detection;

performing a generalize likelihood ratio test (GLRT) on the dual band image, wherein performing the GLRT is accomplished by defining a plurality of intermediate images and processing the intermediate images across the dual band image in parallel to obtain a signal intensity, wherein the signal intensity from the plurality of intermediate images are calculated in parallel and separate from each of the individual plurality of intermediate images such that the signal intensity values of the entire dual band image is calculated at one time; and determining whether the detection in the dual band image represents an object of interest based on the signal intensity that was obtained from performing operations for the intermediate images across the dual band image in parallel.

2. The method of claim 1, further comprising:

defining an image kernel; and generating, via GLRT logic carried by the platform, the plurality of intermediate images, each intermediate image being a function of the image kernel and variance or covariance frames.

3. The method of claim 2, wherein the plurality of intermediate images is five intermediate images.

4. The method of claim 2, wherein the value of the image kernel is of a known signal shape based on a point spread function.

5. The method of claim 2, further comprising:

generating, via the GLRT logic, a plurality of values representing unknown signal intensity (I) in a first band and a second band.

6. The method of claim 5, further comprising:

differentiating with respect to I and setting that differentiation equal to zero.

7. The method of claim 6, further comprising:

substituting functions representing each of the plurality of intermediate images for I, wherein substitution establishes a most likely value of I as a function of the plurality of intermediate images.

8. The method of claim 7, further comprising:

calculating a maximum log likelihood ratio after having substituted the functions representing each of the plurality of intermediate images for I.

9. The method of claim 8, further comprising:

determining whether a maximum log likelihood ratio differs from a threshold relative to a background in the image to indicate the detection.

10. The method of claim 2, further comprising:

repeating the generation of the plurality of intermediate images a number of times (n) with different image kernels that represent n sub-pixel locations for each pixel of the FPA.

11. The method of claim 10, wherein n equal four such that four sub-pixel locations are utilized.

12. The method of claim 10, further comprising:

indicating the detection being located at one of sub-pixel locations when a maximum log likelihood ratio exceeds a threshold at that sub-pixel location.

13. An object detection system comprising:

a platform;

a passive sensor having a focal plane array (FPA) comprising a plurality of pixels carried by the platform, wherein the passive sensor is configured to capture a dual band imager;

GLRT logic configured to perform a generalize likelihood ratio test (GLRT) on the dual band image, wherein the GLRT logic is configured define a plurality of intermediate images, calculate a signal intensity from the plurality of intermediate images in parallel and separate from each of the individual plurality of intermediate images such that the signal intensity values of the entire dual band image is calculated at one time and execute operations for the intermediate images across the dual band image in parallel at one time;

wherein the GLRT logic is responsive to executed operations for the intermediate images across the dual band image in parallel at one time to determine whether a detection that represents an object of interest is present in the dual band image.

14. The system of claim 13, further comprising:

logic to determine a sub-pixel location of intensity of the detection.

15. The system of claim 14, wherein indication of the detection being located at the sub-pixel locations occurs when a maximum log likelihood ratio exceeds a threshold at that sub-pixel location.

16. The system of claim 14, wherein there are at least four sub-pixel locations per pixel.

17. The system of claim 16, wherein the at least four sub-pixel locations per pixel, comprises:

a first sub-pixel location at a center of one pixel;

a second sub-pixel location at an intersection of four pixels;

a third sub-pixel location that straddles two horizontally adjacent pixels; and a fourth sub-pixel location that straddles two vertically adjacent pixels.

18. A computer program product including at least one non-transitory computer readable storage medium having instructions encoded thereon that, when executed by one or more processors, implement a process determine whether a detection in a dual band image represents an object of interest, the process comprising:

obtaining a dual band image from a passive image sensor having a focal plane array (FPA) carried by a platform;

performing a generalize likelihood ratio test (GLRT) on the dual band image, wherein performing the GLRT is accomplished by defining a plurality of intermediate images and performing operations for the intermediate images across the dual band image in parallel at one time, said operations comprising calculating a signal intensity from the plurality of intermediate images in parallel and separate from each of the individual plurality of intermediate images such that the signal intensity values of the entire dual band image is calculated at one time; and determining whether the detection in the dual band image represents the object of interest in response to a result from performing operations for the intermediate images across the dual band image in parallel at one time.

19. The computer program product of claim 18, the process further comprising:

defining an image kernel; and generating, via GLRT logic carried by the platform, a plurality of intermediate images, each intermediate image being a function of the image kernel and variance or covariance frames.

20. The computer program product of claim 19, the process further comprising:

generating, via the GLRT logic, a plurality values of representing unknown signal intensity (I) in a first band and a second band;

differentiating with respect to I and setting that differentiation equal to zero;

substituting functions representing each of the plurality of intermediate images for I, wherein substitution establishes a most likely value of I as a function of the plurality of intermediate images;

calculating a maximum log likelihood ratio after having substituted the functions representing each of the plurality of intermediate images for I; and determining whether a maximum log likelihood ratio differs from a threshold in a manner to be considered different enough from background in the image to indicate the detection.

* * * * *